United States Patent [19]

Kimura et al.

[11] Patent Number: 4,792,358
[45] Date of Patent: Dec. 20, 1988

[54] INORGANIC COATING COMPOSITIONS

[75] Inventors: Toshiro Kimura, Osaka; Giichi Okuno, Ashiya; Yukikazu Moritsu, Nishinomiya; Koji Yamada, Kashiwara, all of Japan

[73] Assignee: Okuno Chemical Industry Co., Ltd., Osaka, Japan

[21] Appl. No.: 34,963

[22] Filed: Apr. 6, 1987

[30] Foreign Application Priority Data

May 26, 1986 [JP] Japan ................... 61-120823

[51] Int. Cl.$^4$ ............ C04B 14/20; C04B 12/04
[52] U.S. Cl. ......................... 106/84; 106/415; 106/481; 427/376.2; 428/404; 428/450
[58] Field of Search ............ 106/84, 291, 308 B; 427/376.2; 428/404, 450

[56] References Cited

U.S. PATENT DOCUMENTS 4,544,415 10/1985 Franz et al. ................. 106/308 B

FOREIGN PATENT DOCUMENTS 149519 8/1966 U.S.S.R. ................. 106/84

Primary Examiner—Steven Capella
Attorney, Agent, or Firm—Armstrong, Nikaido, Marmelstein & Kubovcik

[57] ABSTRACT

This invention provides an inorganic coating composition comprising (a) about 100 parts by weight (based on solids) of a binder component prepared by thermally dissolving about 10 to about 40 parts by weight of fine particles of silica in about 100 parts by weight (based on solids) of potassium silicate and (b) about 15 to about 100 parts by weight of pearl luster pigment.

8 Claims, No Drawings

INORGANIC COATING COMPOSITIONS

FIELD OF THE INVENTION

The present invention relates to inorganic coating compositions, and more particularly to iris-colored inorganic coating compositions which are useful in forming a decoratively colored coat on articles made of substantially any kind of material except those made of plastics and woods and which can produce a coat capable of inhibiting rust on metallic articles. The invention also concerns with coating methods using said coating compositions.

BACKGROUND OF THE INVENTION

Known alkali silicate-type inorganic coating compositions are so poor in curability as to form coats low in resistance to boiling water and like properties and exhibit insufficient rust inhibition and corrosion resistance when applied to metallic articles. A highly active curing agent has been used to produce a coating composition with improved curability, thus free from these drawbacks. However, the use of highly active curing agent significantly accelerates curing, thereby shortening the pot life of coating composition to a great extent. Accordingly the use thereof necessitates cumbersome procedures of separately storing a coating composition and a curing agent and mixing them immediately before application of the composition, hence undesirable.

In preparation of gold- or silver-colored or like metallic inorganic coating compositions, metal powder is used to impart a particular metallic luster to a film to be formed. Metal powder, however, when subjected to a high temperature of more than 500° C. is oxidized to become black and devoid of metallic luster. Further, iris-colored inorganic metallic coating compositions with fully satisfactory properties have not been developed heretofore.

SUMMARY OF THE INVENTION

It is an object of the present invention to provide an inorganic coating composition having a high curability.

It is another object of the invention to provide an inorganic coating composition capable of forming coats outstanding in properties such as resistance to boiling water.

It is a further object of the invention to provide an inorganic coating composition capable of forming on metallic articles coats having resistance to rust and corrosion.

It is a still further object of the invention to provide an inorganic coating composition having a significantly long pot life.

It is an additional object of the invention to provide an inorganic coating composition capable of producing oxidation-resistant coats which can retain metallic luster even under high temperature conditions.

Other objects and features of the present invention wil become apparent from the following description.

The present invention provides an inorganic coating composition comprising (a) about 100 parts by weight (based on solids) of a binder component prepared by thermally dissolving about 10 to about 40 parts by weight of fine particles of silica in about 100 parts by weight (based on solids) of potassium silicate and (b) about 15 to about 100 parts by weight of pearl luster pigment.

The present invention further provides a coating method comprising the steps of applying an inorganic coating composition to the surface of an article to be coated which coating composition comprises (a) about 100 parts by weight (based on solids) of a binder component prepared by thermally dissolved about 10 to about 40 parts by weight of fine particles of silica in about 100 parts by weight (based on solids) of potassium silicate and (b) about 15 to about 100 parts by weight of pearl luster pigment, and heating the coated article to a temperature of about 200° to about 400° C. for curing.

DETAILED DESCRIPTION OF THE INVENTION

Usable as potassium silicate in the present invention is any of those commercially available in liquid form.

The fine particles of silica to be used in the present invention are those which have silanol (Si-OH) groups on the surface of particle and optionally partly inside thereof, which are soluble in alkali silicate and which are about 40 μm or less in mean particle size. Fine particles of silica useful in the invention can be any of those commercially available and include so-called white carbon (product prepared from sodium silicate by wet process) and fine particles of anhydrous silica (product prepared from halogenated silicon by dry process).

Pearl luster pigments useful in the invention include widely commercially available non-toxic micatitanium oxide pearl luster pigments such as a pigment by EM Chemicals Co., Ltd. U.S.A. (available under a trade name "Iriodin"). Pearl luster pigments are various and include those of silver-, iris color- and colored-type and the like. Any of them is usable in the invention.

According to the present invention, the binder component in the inorganic coating composition is prepared by thermally dissolving fine particles of silica in potassium silicate. The amount of fine particles of silica used is about 10 to about 40 parts by weight, preferably about 12 to about 38 parts by weight, per 100 parts by weight of the potassium silicate based on solids. Use of less than 10 parts by weight gives a coat unsatisfactory in resistance to boiling water, whereas use of more than 40 parts by weight accelerates curing of the coat and tends to develop cracks in the coat.

The amount of pearl luster pigment used is about 15 to about 100 parts by weight, preferably about 20 to about 90 parts by weight, per 100 parts by weight of the binder component based on solids. Use of less than 15 parts by weight results in formation of coat insufficient in hiding power. In this case, if a larger amount of coating composition is applied to provide a coat with an improved hiding power, blisters are likely to occur on thermal cure. Use of 100 parts by weight impairs the cohesion of the binder, leading to formation of coat lower in resistance to boiling water and to saline solutions and like properties and also in adhesion between the coat and the substrate. Moreover, use of excess pigment is uneconomical.

The coating composition of the present invention is prepared by the following process. Into a reactor are placed specific amounts of potassium silicate and fine particles of silica. The mixture is stirred at a temperature of about 80° to about 100° C. for about 1 to 2 hours to completely dissolve the silica into the potassium silicate, whereby the contemplated binder component is produced. In the preparation of binder component, water may be used in an amount of up to about 400 parts by weight per 100 parts by weight, based on solids, of mixture of potassium silicate and fine particles of silica. The presence of water facilitates the mixing and dissolution of silica in potassium silicate, thereby improving the efficiency of coating operation.

Subsequently the specified amount of pearl luster pigment is added to about 100 parts by weight of the binder component thus prepared, and the mixture is homogenized by a stirrer or a ball mill for about 2 to about 4 hours, giving a coating composition according to the present invention.

In the coating composition of the invention, potassium silicate acts as a main active component for the binder while the fine particles of silica serves as a curing agent for the potassium silicate. To cure the coating composition of the invention, potassium silicate and fine particles of silica are heated to a temperature of about 220° C. at which condensation reaction of silanol groups proceeds between the silicate and the silica and between the same species of the two components.

In preparing the binder component according to the present invention as stated above, the mixture of potassium silicate and fine particles of silica is heated to a temperature of about 80° to about 100° C. to dissolve the latter in the former. However, the condensation reaction of silanol groups is not completed in the above-specified temperature range so that the binder component thus prepared is substantially not cured. Further the condensation reaction of silanol groups does not proceed at room temperature. Accordingly the coating composition of the present invention with the components as mixed can be stored for a prolonged period of time.

The coating composition of the present invention thus obtained can be applied by conventional methods such as spraying, dipping and like methods to the surface of articles made of substantially any kind of material except those of plastics or woods which exhibit no durability when heated. It is desirable in the present invention to apply the coating composition to an article to be coated in an amount of about 60 to about 100 g/m² based on solids and to form a film having a thickness of about 10 to about 15 μm. The coating composition applied is heated to a temperature of about 200° to about 400° C., preferably about 220° to about 300° C., for about 10 to about 20 minutes at which the unreacted silanol groups in the potassium silicate and fine silica particles are subjected to condensation reaction to cure the coating composition on completion of reaction.

The inorganic coating composition of the present invention has the following advantages.

(1) The coating composition of the invention is stable at room temperature and remains free from curing or change of properties during storage over a long period of time.
(2) Unlike conventional inorganic coating compositions, the coating composition of the invention does not require incorporation of a curing agent before use, thereby enhancing the operational efficiency to a considerable extent and eliminating the need to install a costly coating equipment.
(3) The coating composition of the invention can form a decoratively colored coat, namely an iris-colored coat, on articles including those made of substantially all kinds of materials except those made of plastics or woods. The coat thus produced has a high adhesion to the substrate and an improved hardness and is outstanding in thermal resistance, abrasion resistance, resistance to boiling water, corrosion resistance and like properties.
(4) The coating composition of the invention displays rust resistance and corrosion resistance when deposited on a metallic substrate.

The present invention will be described below in greater detail with reference to the following examples.

EXAMPLE 1

Using components in the amounts specified below in Table 1 (part by weight), inorganic coating compositions were prepared by the following procedure.

To 100 parts by weight (based on solids) of alkali silicate were added fine silica particles, and then water was added in the amount specified per 100 parts by weight of mixture of alkali silicate (based on solids) and fine silica particles. The mixture was heated with stirring in a reactor for dissolution to a temperature of 90° to 100° C. for 2 hours, giving a binder component.

To 100 parts by weight (based on solids) of the binder component thus obtained was added pearl luster pigment and the mixture was agitated by a ball mill for 3 hours to give a homogeneous coating composition. In this way, there were obtained specimens Nos. 1 and 2 (coating compositions of the present invention) and specimens Nos. 3 to 6 (comparison coating compositions). Each of the coating compositions thus obtained was applied by spraying to a commercially available cold-rolled steel sheet (as specified in JIS G 3141 SPCC) in an amount of 60 to 90 g/m². The coated sheet was heated to a temperature of 220° C. for 20 minutes for curing to obtain a test panel. Table 1 below shows the results.

TABLE 1

| | Alkali silicate | | | | | |
|---|---|---|---|---|---|---|
| | Potassium silicate (*1) | | Sodium silicate (*2) | | Lithium silicate (*3) | |
| Specimen No. | 1 | 2 | 3 | 4 | 5 | 6 |
| Fine silica particles (*4) (part by weight) | 15 | 25 | 35 | 56 | 5 | 20 |
| Water (*5) (part by weight) | 260 | 280 | 227 | 165 | 328 | 330 |
| Pearl luster pigment (*6) (part by weight) (*7) | 50 | 50 | 50 | 50 | 50 | 50 |
| Test (*8) | | | | | | |
| Coating thickness (cured) (μm) | 13 | 15 | 12 | 14 | — | — |
| Appearance of coating surface | A | A | A | A | C | C |
| Resistance to boiling water | A | A | C | C | — | — |
| Spraying test for resistance to saline solutions | A | A | B | B | — | — |
| Outdoor exposure test | A | A | C | C | — | — |
| Thermal resistance | A | A | C | A | — | — |

TABLE 1-continued

| | Alkali silicate | | | | | |
|---|---|---|---|---|---|---|
| | Potassium silicate (*1) | | Sodium silicate (*2) | | Lithium silicate (*3) | |
| Specimen No. | 1 | 2 | 3 | 4 | 5 | 6 |
| Adhesion | 100/100 | 100/100 | 100/100 | 100/100 | — | — |
| Pencil hardness | Over 9 H | Over 9 H | Over 9 H | Over 9 H | — | — |
| Abrasion resistance (mg) | 0.38 | 0.31 | 0.34 | 0.26 | — | — |

Note:
(*1) Commercially available product, potassium silicate (product of The Nippon Chemical Industrial Co., Ltd., Japan)
(*2) Commercially available product, Water Glass No. 1 (trade name, product of Osaka Soda Co., Ltd., Japan)
(*3) Commercially available product, lithium silicate (1:4 mixture, product of Honjo Chemical Co., Ltd., Japan)
(*4) Commercially available product, Nip Seal E-220 (trade name, product of Nippon Silica Kogyo Kabushiki Kaisha, Japan)
(*5) Amount of water used per 100 parts by weight of mixture of alkali silicate (based on solids) and fine silica particles
(*6) Commercially available product, 4670 Iriodin 100 Silver Pearl (trade name, product of EM Chemicals Co., Ltd., U.S.A.)
(*7) Amount used per 100 parts by weight (based on solids) of the binder component
(*8) Test (i) Appearance of coating surface:
The test panel was heated to 220° C. for 20 minutes to evaluate the change in appearance of coating surface according to the following ratings.
A: Uniform coat was formed without crack or peeling.
B: Cracks and peeling occurred.
C: Cracks and peeling took place during heating and curing.
(ii) Resistance to boiling water:
The test panel was immersed in boiling water for 100 hours to evaluate the change in appearance of coating surface according to the following ratings.
A: No change.
B: Discolored (partially whitened).
C: Peeled off when rubbed with a finger.
(iii) Spraying test for resistance to saline solutions:
The test was performed according to JIS-Z-2371 by observing the appearance of coating surface 720 hours after spraying a saline solution to evaluate the change in appearance of coating surface according to the following ratings.
A: No change.
B: Discolored (partially whitened), but free of formation of red rust.
C: Red rust formed.
(iv) Outdoor exposure test:
The test panel was exposed outdoor in an industrial district for 1 year to evaluate the change in appearance of coating surface according to the following ratings.
A: No change.
B: Sparsely covered with white powder but to an extent of the powder being readily rubbed out by lightly wiping with a piece of cloth.
C: Densely covered with white powder to an extent of the powder being unremovable by wiping with a piece of cloth.
(v) Thermal resistance:
The test panel was left to stand in an electric furnace at a temperature of 500° C. for 100 hours to evaluate the change in appearance of coating surface according to the following ratings.

A: No change.
B: Discolored.
C: Blistered.
(vi) Adhesion:
The test panel was cut crosswise with a knife to the substrate to form 100 squares, each 10 mm × 10 mm and an adhesive cellophane tape was adhered to the surface thus crosswise cut and peeled off to count the number of squares to which the tape remained adhered.
(vii) Pencil hardness:
Using a Mitsu-Bishi pencil, UNI (trade name, product of Mitsubishi Co., Ltd.), the hardness of the film was evaluated.
(viii) Abrasion resistance:
The amount (mg) of abraded portion was measured by a Taber's abrasion resistance tester, CB-10 (1000 g × 1000 revolutions).

Table 1 shows that the inorganic coating compositions prepared using alkali silicate other than potassium silicate gave the unsatisfactory films, and that more specifically, the coating compositions containing sodium silicate produced the films sparsely covered with white powder and lower in resistance to boiling water while the coating compositions containing lithium silicate were incapable of forming a film.

EXAMPLE 2

Coating compositions (specimens Nos. 8 to 12) of the present invention and comparison coating compositions (specimens Nos. 7 and 13) were prepared by repeating the procedure of Example 1 with the exception of using silica and water in amounts (part by weight) listed below in Table 2 per 100 parts by weight of potassium silicate to prepare a binder component and mixing the binder component thus obtained with pearl luster pigment by a ball mill for 2 hours. Test panels were produced in the same manner as in Example 1 with the exception of applying each coating composition in an amount of 90 to 100 g/m$^2$, and tests were performed using the test panels by the foregoing methods. Table 2 below shows the results.

TABLE 2

| Specimen No. | 7 | 8 | 9 | 10 | 11 | 12 | 13 |
|---|---|---|---|---|---|---|---|
| Fine silica particles (*1) (part by weight) | 8 | 10 | 20 | 25 | 30 | 40 | 45 |
| Water (part by weight) | 200 | 200 | 200 | 250 | 270 | 300 | 350 |
| Pearl luster pigment (*2) (part by weight) (*3) | 45 | 45 | 45 | 45 | 45 | 45 | 45 |
| Test | | | | | | | |
| Coating thickness (cured) (μm) | 12 | 12 | 13 | 15 | 15 | 14 | 15 |
| Appearance of coating | A | A | A | A | A | A | B |

TABLE 2-continued

| Specimen No. | 7 | 8 | 9 | 10 | 11 | 12 | 13 |
| --- | --- | --- | --- | --- | --- | --- | --- |
| surface | | | | | | | |
| Resistance to boiling water | C | B | A | A | A | A | — |
| Spraying test for resistance to saline solutions | B | A | A | A | A | A | — |
| Outdoor exposure test | B | A | A | A | A | A | — |
| Thermal resistance | B | A | A | A | A | A | — |
| Adhesion | 100/100 | 100/100 | 100/100 | 100/100 | 100/100 | 100/100 | — |
| Pencil hardness | Over 9 H | Over 9 H | Over 9 H | Over 9 H | Over 9 H | Over 9 H | — |
| Abrasion resistance (mg) | 0.41 | 0.38 | 0.37 | 0.36 | 0.32 | 0.31 | — |

Note:
(*1) Commercially available product, Nip Seal E-200 (trade name, product of Nippon Silica Kogyo Kabushiki Kaisha, Japan)
(*2) Commercially available product, 4285 Iriodin 205 Rutile Platinum Gold (trade name, product of EM Chemicals Co., Ltd.)
(*3) Amount used per 100 parts by weight (based on solids) of the binder component Table 2 shows that the coating composition containing fine silica particles in less than the specified amount gave the film inferior in resistance to boiling water (specimen No. 7) while the coating composition containing the same in more than the specified amount exhibited a lower film-forming property (specimen No. 13).

EXAMPLE 3

Coating compositions of the present invention (specimen No. 15 to 18) and comparison coating compositions (specimens no. 14 and 19) were prepared by repeating the procedure of Example 1 except that a binder component was prepared from silica and water in amounts specified below in Table 3 per 100 parts by weight of potassium silicate and that the binder component thus obtained and pearl luster pigment were mixed together by a ball mill for 4 hours. Test panels were produced in the same manner as in Example 1 using the coating compositions thus prepared and were tested with the results shown below in Table 3.

EXAMPLE 4

A 45 part by weight portion of pearl luster pigment, "Cloisonne Copper" (trade name, product of The Mearl Corporation) was added to 100 parts by weight, based on solids, of the binder component obtained in Example 3 for specimen No. 17. The mixture was homogenized by a ball mill for 2 hours, giving a coating composition according to the present invention. The coating composition thus obtained was applied by spraying to each of a commercially available plate made of asbestos cement and calcium silicate and a commercially available concrete block in an amount of 90 g/m$^2$. The coated substrate was heated to 220° C. for 20 minutes. The film thus formed had an attractive reddish brown pearl luster and was excellent in abrasion resistance and high in adhesion and hardness.

EXAMPLE 5

To 100 parts by weight, based on solids, of potassium silicate was added 20 parts by weight of fine silica parti-

TABLE 3

| Specimen No. | 14 | 15 | 16 | 17 | 18 | 19 |
| --- | --- | --- | --- | --- | --- | --- |
| Fine silica particles (*1) (part by weight) | 24 | 24 | 24 | 24 | 24 | 24 |
| Water (part by weight) | 200 | 250 | 270 | 280 | 290 | 290 |
| Pearl luster pigment (*2) (part by weight) (*3) | 10 | 30 | 50 | 70 | 100 | 120 |
| Test | | | | | | |
| Coating thickness (cured) (μm) | — | 12 | 13 | 14 | 14 | 16 |
| Appearance of coating surface | B | A | A | A | A | A |
| Resistance to boiling water | — | A | A | A | A | C |
| Spraying test for resistance to saline solutions | — | A | A | A | A | C |
| Outdoor exposure test | — | A | A | A | A | A |
| Thermal resistance | — | A | A | A | A | A |
| Adhesion | — | 100/100 | 100/100 | 100/100 | 100/100 | 100/100 |
| Pencil hardness | — | Over 9 H | Over 9 H | Over 9 H | Over 9 H | Over 9 H |
| Abrasion resistance (mg) | — | 0.38 | 0.41 | 0.39 | 0.42 | 0.48 |

Note:
(*1) Commercially available product, Nip Seal AQ (trade name, product of Nippon Silica Kogyo Kabushiki Kaisha)
(*2) Commercially available product, Cloisonne Green (trade name, product of The Mearl Corporation)
(*3) Amount used per 100 parts by weight (based on solids) of the binder component Table 3 reveals that the coating composition containing pearl luster pigment in less than the specified amount produced the film inferior in all properties (specimen No. 14) while the coating composition containing the same in more than the specified amount gave the film lower in resistance to boiling water and resistance to saline solutions (specimen No. 19).

cles (commercially available product, trade name "Aerozil-200", product of Nippon Aerozil Kabushiki Kaisha, Japan). Water was added to the mixture in an amount of 260 parts by weight per 100 parts by weight of mixture of potassium silicate (based on solids) and fine silica particles. The mixture was heated in a reactor with stirring at 90° to 100° C. for 2 hours for dissolution to obtain a binder component. A 30 part by weight portion of pearl luster pigment (a commercially available product, trade name "4708 Iriodin 220 Perlblau/Blue Pearl," product of EM Chemicals Co., Ltd.) was added to 100 parts by weight, based on solids, of the binder component thus obtained. The mixture was homogenized by a stirrer for 30 minutes, giving a coating composition according to the present invention. The coating composition thus prepared was applied by spraying to a commercially available aluminum plate (specified in JIS H-4000-A5052P) in an amount of 70 g/m$^2$. The coated plate was heated to 220° C. for 20 minutes for curing. The film thus formed had an attractive blue pearl luster and was excellent in corrosion resistance and high in adhesion and hardness.

We claim:

1. An inorganic coating composition consisting essentially of (a) about 100 parts by weight (based on solids) of a binder component prepared by thermally dissolved about 10 to about 40 parts by weight of fine particles of silica in about 100 parts by weight (based on solids) of potassium silicate and (b) about 15 to about 100 parts by weight of pearl luster pigment.

2. An inorganic coating composition according to claim 1 wherein the fine particles of silica are present in an amount of about 12 to about 38 parts by weight per 100 parts by weight of the potassium silicate based on solids.

3. An inorganic coating composition according to claim 1 wherein the pearl luster pigment is present in an amount of about 12 to about 38 parts by weight per 100 parts by weight of the binder component based on solids.

4. A coating method comprising the steps of applying an inorganic coating composition to the surface of an article to be coated which coating composition consisting essentially of (a) about 100 parts by weight (based on solids) of a binder component prepared by thermally dissolving about 10 to about 40 parts by weight of fine particles of silica in about 100 parts by weight (based on solids) of potassium silicate and (b) about 15 to about 100 parts by weight of pearl luster pigment, and heating the coated article to a temperature of about 200° to about 400° C. for curing.

5. An inorganic coating composition according to claim 4 wherein the fine particles of silica are present in an amount of about 12 to about 38 parts by weight per 100 parts by weight of the potassium silicate based on solids.

6. An inorganic coating composition according to claim 4 wherein the pearl luster pigment is present in an amount of about 20 to about 90 parts by weight per 100 parts by weight of the binder component based on solids.

7. A coating method according to claim 4 wherein the coated article is heated at a temperature of about 220° to about 300° C. for curing.

8. An article covered with the colored coat formed by the coating method as defined in claim 4.

* * * * *